United States Patent [19]

Lassig

[11] 3,836,020
[45] Sept. 17, 1974

[54] CONTAINER/CARGO HANDLING PLANT

[75] Inventor: Harry Lassig, Hamburg-Schenefeld, Germany

[73] Assignee: Firma Fordertechnik Hamburg Harry Lassig, Hamburg-Schenefeld, Germany

[22] Filed: Mar. 12, 1973

[21] Appl. No.: 339,773

[30] Foreign Application Priority Data
Nov. 11, 1972 Germany............................ 2255346

[52] U.S. Cl. ........................ 214/16.4 C, 214/16.4 R
[51] Int. Cl. .............................................. B65g 1/06
[58] Field of Search ........ 214/16 B, 16.4 A, 16.4 R, 214/14, 16.4 C

[56] References Cited
UNITED STATES PATENTS 3,543,952  12/1970  Young .................................. 214/14
3,559,822  2/1971  Lichtenford ............... 214/16.4 A X
3,608,750  9/1971  Young .......................... 214/16.4 A Primary Examiner—Robert J. Spar
Assistant Examiner—R. B. Johnson
Attorney, Agent, or Firm—Toren, McGeady and Stanger

[57] ABSTRACT

A container/cargo handling plant allowing full automatic loading and/or unloading of containers with pallet cargo or discrete cargo or the like, assembling of containers in an assembly area or within various levels of a frame structure, and further adapted to semi-automatic or fully automated loading or unloading of empty or freight-holding containers onto or respectively from transportation means of any type, as well as storing such containers. The plant essentially includes a frame structure having several levels, hoisting and conveyor means, a loading/unloading apparatus, drive and control means.

3 Claims, 14 Drawing Figures

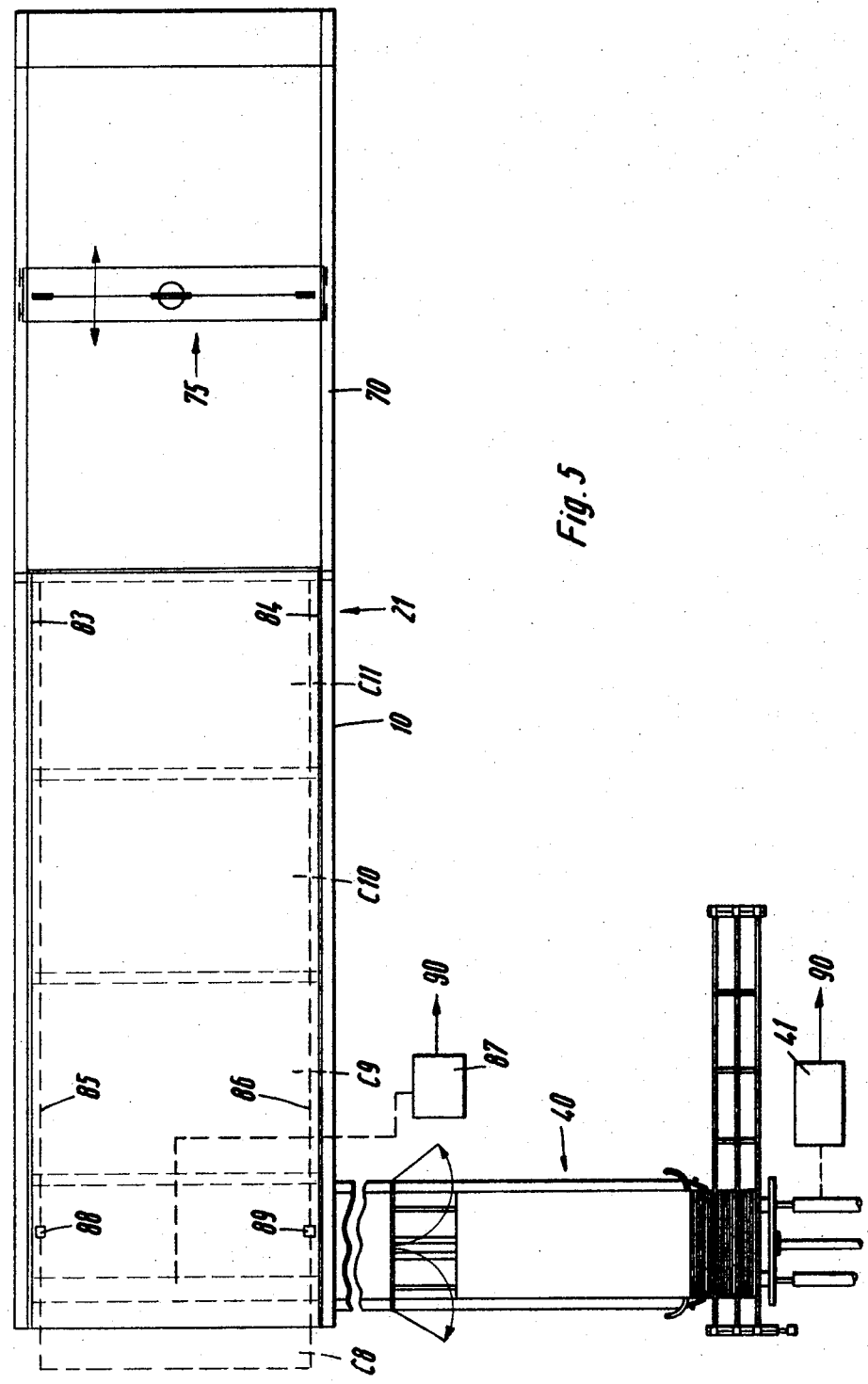

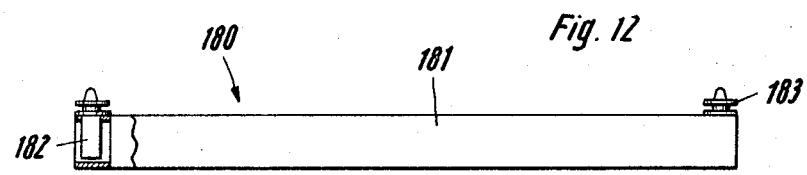
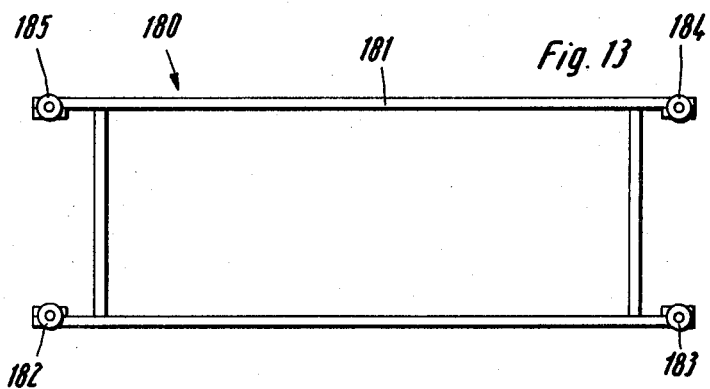
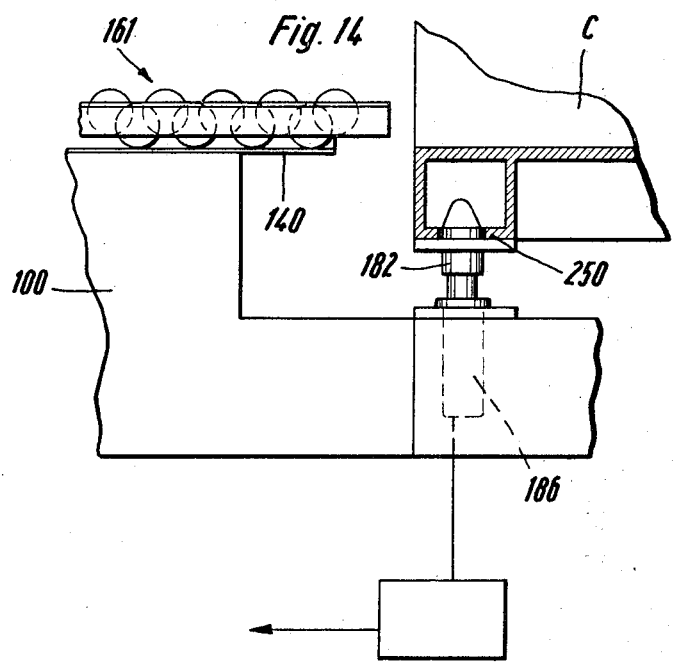

3,836,020

CONTAINER/CARGO HANDLING PLANT

The present invention relates to a plant adapted for loading, unloading and assembling containers and for loading and unloading containers into and from transportation means such as rail and road vehicles or inland shipping vessels.

Various types of container terminals are known, for loading and unloading containers into and from sea-going vessels, together with associated cargo handling and transportation means. Likewise known are various types of container handling and transporting apparatus and these prior art apparatus are of different degrees of technical complexity and are usually employed in places where containers must be moved.

It is an object of the present invention to provide a noval and improved cargo handling plant adapted for loading, unloading and assembling containers and for loading and unloading containers into and from the most varied transportation means in those cases in which a company is confronted with substantial cargo input and output volumes that may only be handled by continuous cargo handling operations such as by continuously discharging containers from vehicles, unloading the containers, loading cargo into containers and to transfer containers loaded with cargo from one place to another place. Any intermediate operations such as loading full containers and removing empty containers or vice-versa, i.e., removing loaded containers and loading empty containers must likewise be within the scope of operation of such a cargo handling plant.

In accordance with the present invention, a container/cargo handling plant of the type defined above comprises a support frame assembly including at one side thereof a vertically extending hoisting shaft with a transfer hoist movable up and down within the hoisting shaft; a plurality of platform levels mutually spaced along the vertical extension of the support frame assembly, each platform level in communication with the hoisting shaft; a container loading apparatus for loading discrete cargo units into a container, the container loading apparatus disposed in the vicinity of the lower end of the hoisting shaft; a horizontally extending first conveyor in line with the container loading apparatus for feeding containers to the hoisting shaft; a movable container hoisting and transporting apparatus for moving containers into a loading zone of the transportation means, the hoisting and transporting apparatus disposed at the discharge side of the first conveyor and movable in a horizontal direction above the first conveyor; a second conveyor extending above the first conveyor and disposed in line with a track of the hoisting apparatus; movable suspension means for containers arranged on the first and second conveyors and on the platform levels of the support frame assembly, each suspension means including a frame corresponding substantially to the shape and size occupied by the base area of a container and mounting a plurality of axles extending parallel to a longitudinal axis of the frame or a plurality of axles extending transversely of the longitudinal axis of the frame, a plurality of rollers journalled on the axles, and trunnions adapted to engage upper corner fittings on the containers and to be interlocked with the corner fittings; an interlocking device for a cargo engaging member of the container hoisting and transporting apparatus, whereby the first and second conveyors in the support frame assembly and the platform levels consist of pairs of runway rails and each pair of runway rails is arranged at a spacing corresponding substantially either to the length or the width of a container and serves as a guide means for the container suspension means.

In a plant of this type as above described each of the conveyors in the support frame assembly may comprise motor driven entrainment means such as driven continuous chains or the like provided with engagement members for the container suspension means to move the containers along the conveyor tracks and along the platform levels of the support frame assembly.

To fully automate the various operations performed by the plant the drive means for moving the containers along the conveyor tracks and along the platform levels of the support frame assembly, and the drive means for the container hoisting and transporting apparatus, and the drive means for the container loading apparatus are operatively connected to a central program cycle control device.

In the following, the invention will be described more in detail with reference to a preferred embodiment of a container/cargo handling plant schematically shown in the appended drawings wherein FIG. 1 is a lateral elevational view of a container/cargo handling plant in accordance with the present invention and comprising several platform levels for storing containers, a transfer hoist and a hoisting mechanism;

FIG. 5 is a top view of the container/cargo handling plant together with the associated container loading apparatus;

FIG. 12 is a lateral elevational view of the support for mounting a container;

FIG. 13 is a top view of the support shown in FIG. 12 and

FIG. 14 is a fragmentary view of the container support with part of a container mounted thereon, partly in elevation and partly in vertical cross-section.

The novel container/cargo handling plant according to the present invention includes a container loading apparatus, and an assembly area for full containers ready for loading. conveyor means for transporting the full containers to a loading ramp, apparatus for loading the full containers onto transportation means such as rail or road vehicles, inland ships and the like, apparatus for unloading empty containers from such transportation means and facilities for storing empty containers.

Figure 1:
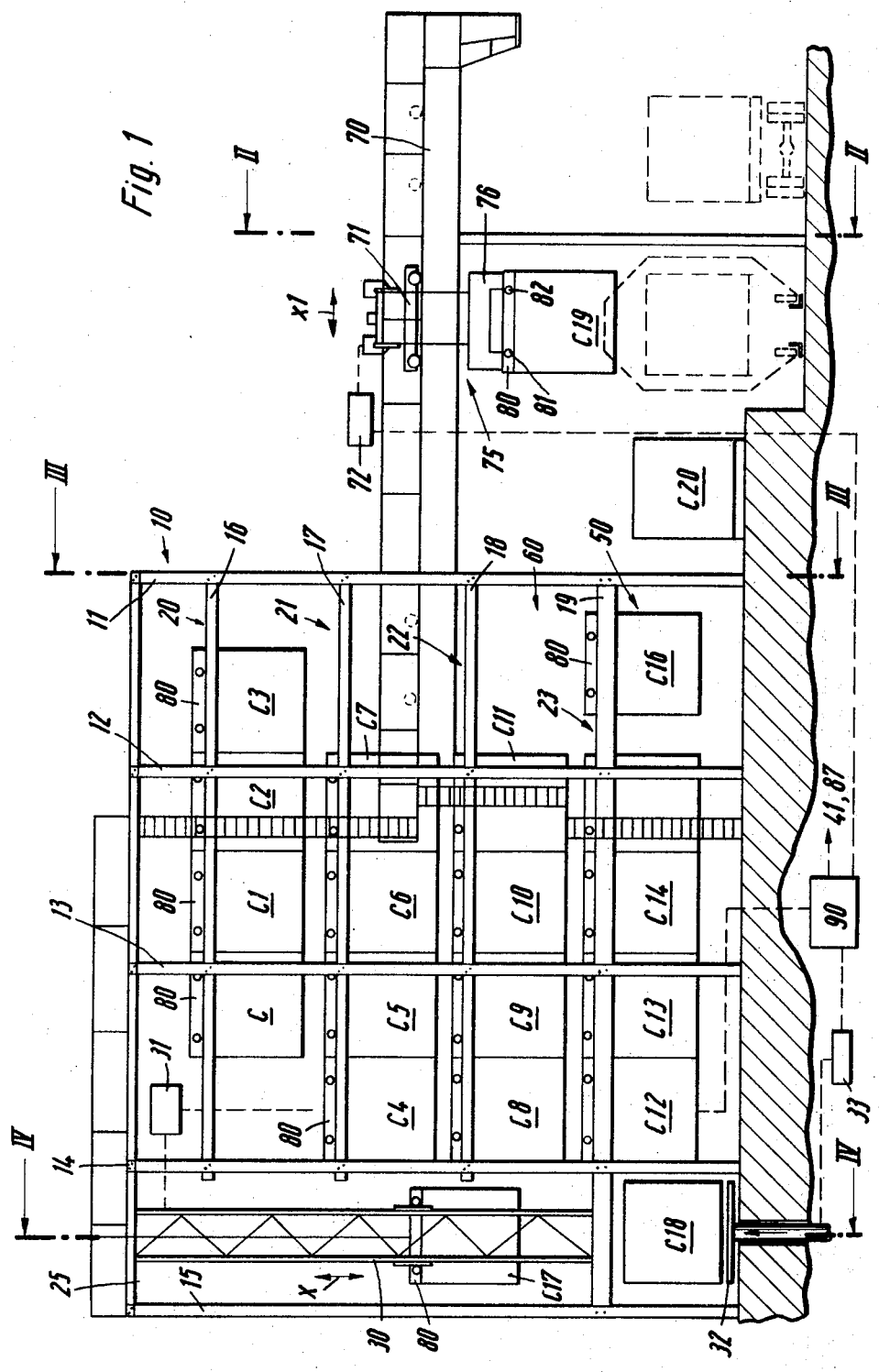

Referring to FIG. 1, the embodiment shown therein comprises a support frame assembly 10 consisting of vertical columns 11 – 15 and horizontal beams 16 – 19 assembled in the form of a structural building frame. The horizontal beams 16–19 define platform levels 20–23 of a length corresponding substantially at least to the length of a container and of a width corresponding to a multiple of the width of a container so that several containers C, C1, C2, C3 may be arranged in one and the same level, as shown in the forth level 20 in FIG. 1.

The support frame assembly 10 of FIG. 1 holds additionally the containers designated by the reference numerals C4 – C20.

Figure 4:
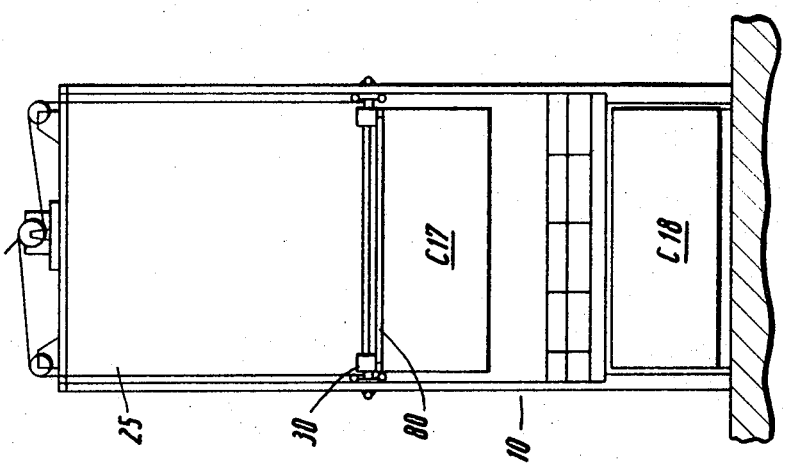
FIG. 4 is a cross-sectional vertical view along the line IV—IV of FIG. 1.
Figure 3:
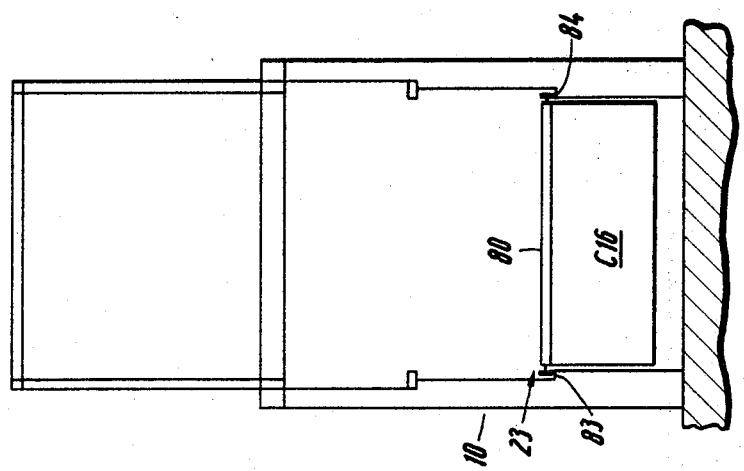
FIG. 3 is a cross-sectional vertical view along the line III—III of FIG. 1.

A vertical hoisting shaft 25 with a transfer hoist 30 is mounted at the rear (i.e., the left hand side shown in FIG. 1) of the support frame assembly 10. A motive means 31 shown in FIG. 4 allows the transfer hoist 30 to move containers up and down along the hoisting shaft 25 as indicated by the double headed arrow x. The hoisting shaft 25 and the various levels 20–23 are constructed in a manner to permit the hoist 30 to feed containers to any one of the various levels 20–23.

A hoisting platform 32 is arranged at the lower end of the hoisting shaft 25 and is adapted to be raised or lowered by means of an electrical or hydraulic motive means 33. The hoisting platform 32 will be described further below more in detail.

An apparatus 40 for loading containers (FIG. 5) is arranged in the vicinity of the lower end of the hoisting shaft 25. The loading apparatus 40 will be discussed further below. At the discharge end of the loading apparatus 40 is disposed a horizontal conveyor 50, and a second conveyor 60 is mounted in the support frame assembly 10 above the first conveyor 50. A cantilevered track 70 is mounted above the conveyor 50. Carriages 71 or a container hoisting and transporting apparatus 75 for moving containers along the track 70 in the direction of the double headed arrow $x_1$ are driven by a motive means schematically indicated at 72. The track 70 allows the apparatus 75 to feed containers either into the level 22 or into the level 23 or to withdraw containers from any of these levels 22 and 23. A loading ramp or a driveway for trucks or similar vehicles may extend underneath the cantilever section of the track 70 (FIG. 1).

Figure 2:
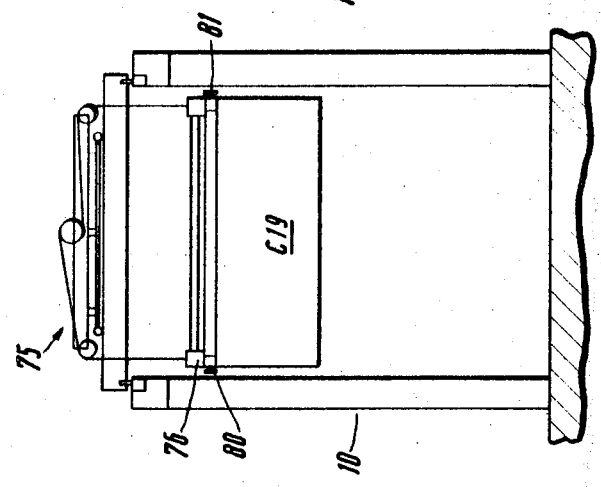
FIG. 2 is a cross-sectional vertical view along the line I—II of FIG. 1.

The transport of containers along the platform levels 20, 21 and along the conveyors 50, 60 is effected by suspension means 80 (FIGS. 1, 2 and 4) consisting of a rectangular frame the shape and size of which correspond substantially to the base area of a container. These frames are provided at their lateral faces with rollers 81, 82 journalled on axles extending parallel to the longitudinal direction of the containers. The frames of the suspension means 80 are provided with conventional mounting means such as elements 182–185 shown in FIGS. 12–14. Such mounting means may consist of centering and detent dowels or trunnions adapted to engage corner fittings on the containers and to be interlocked with such corner fittings thus suspending the containers from the frames of the suspension means 80.

The conveyors 50 and 60 and the platform levels 20, 21 comprise means for receiving the suspension means 80. Such receiving means may consist of runway rails, and such rails may replace the horizontal beams 16–19. FIG. 5 shows a pair of such runway rails 83, 84. The spacing of the two runway rails 83, 84 corresponds substantially to the length of a container. It goes without saying that several pairs of runway rails may be arranged side by side thus allowing to accommodate a corresponding plurality of containers. It is not necessary that the rollers 81, 82 of the suspension means 80 are disposed on the lateral faces thereof. The rollers may likewise be mounted along the longitudinal side walls of the frames, and in this case the containers will be arranged one behind the other in their longitudinal direction. The mutual spacing of the runway rails of a rail pair will then be selected correspondingly.

In the above described arrangement, the frames of the suspension means 80 are adapted to be connected to upper corner regions of the containers so that the containers are suspended when being moved into the tracks of the various platform levels 20–23. According to a modified embodiment, the frames of the suspension means 80 may be arranged as a support frame whereby the containers are rested on the floor of the frame and interlocked with the frame at their bottom portions.

The suspension means 80 supporting containers or not may be moved along the platform levels 20–23 by means of suitable transport means such as continuous chains or cables 85, 86 driven by a motive means 87 and provided with engagement members indicated at 88, 89 and adapted to engage matingly shaped members on the suspension means 80. When for example feeding the container C16 into the platform level 19 by means of the hoisting and transporting apparatus 75 and assuming that the platform level 19 is still empty or only partially occupied by containers the container C16 will be shifted into the position shown occupied by container C12 by means of the transport devices 85, 86. The transfer hoist 30 is likewise provided with guide and support rails 34, 35 adapted to receive the rollers 81, 82 on the frames of the suspension means 80 when transferring a container from one platform level to a different platform level or into the zone of the lowermost conveyor 50. The hoisting apparatus 75 likewise comprises a cargo engaging member indicated at 76 which member is adapted to engage the suspension means 80 (FIG. 1).

For fully automated operation of the container/cargo handling plant the motive means 31, 33, 72 and 87 as well as the motive means 41 for the container loading apparatus 40 are connected to a program cycle control device 90, as schematically indicated in FIG. 1. The various operations performed by the container/cargo handling plant such as loading, unloading, storing and the like will be discussed further below.

The container loading apparatus 40 may be of the type described in the following or of any other suitable design. The apparatus 40 for loading containers with cargo preferably stacked on pallets generally comprises a base 100 mounting a track 140 for a conveying carriage 160 and a support 180 for mounting a container C which is to be loaded. The base 100 is also provided with a clearance indicator frame 200 serving to sense the contours of the cargo when transferring the loaded pallets onto the roller conveying carriage and when driving the pallets into the container.

Figure 6:
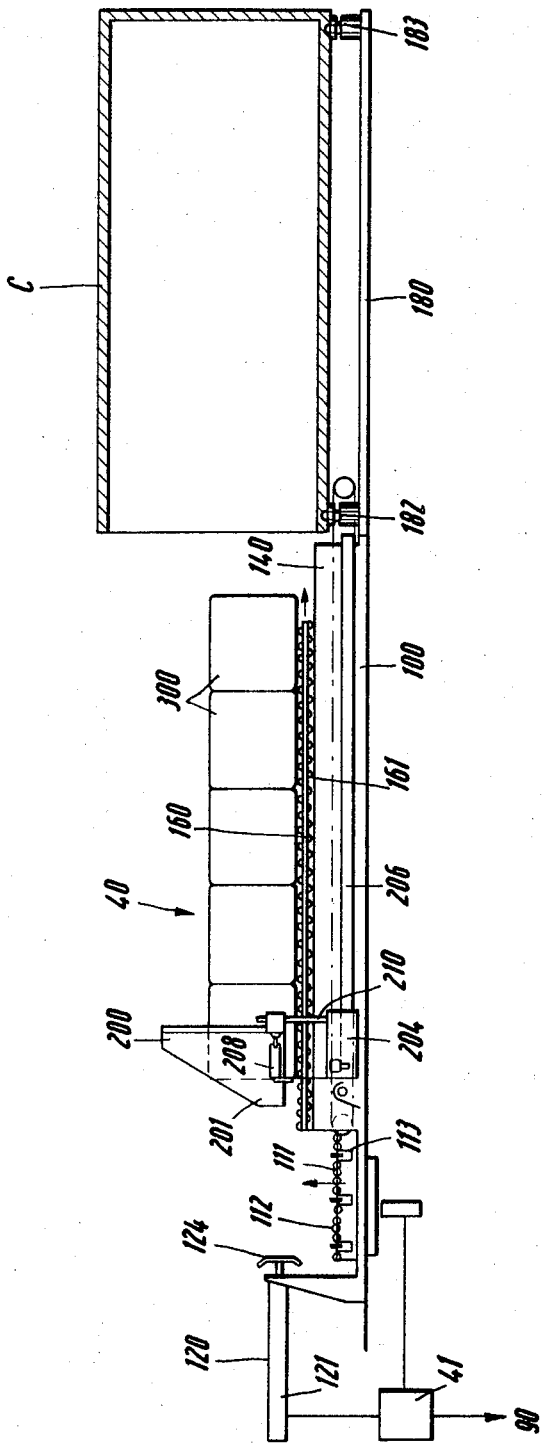
FIG. 6 is a lateral elevational view of the container loading apparatus including a roller carriage, a track and a support for mounting a container.

Cargo carrying pallets or discrete cargo units are supplied to the apparatus preferably by means of a feeding conveyor which may have the form of a chain conveyor 115 and conveys such pallets or cargo units towards a roller train 111 the rollers 112 of which are mounted on axes extending transversely of the feed direction of the conveying carriage. The hoisting roller train 111 is mounted in a vertically adjustable support 113 so that the roller train 111 may be elevated substantially up to the elevation of the conveying roller carriage 160. The feeding conveyor having the form of a chain conveyor 115 is operatively associated with the hoisting roller train 111 so that a correct transfer of loaded pallets 300 onto the hoisting roller train 111 is ensured. The feeding conveyor 115 extends in the base 110 preferably transversely of the feed direction of the conveying carriage 160. The transfer of loaded pallets 300 from the hoisting roller train 111 onto the conveying carriage 160 is effected by means of a pusher mechanism 120 arranged in the transfer region of pallets 300 from the feeding conveyor 115 onto the hoisting roller train 111 and movable in a direction parallel to the feed direction of the conveying carriage. The pusher mechanism 120 is operatively coupled to an actuating mechanism 121. An adjustable limit stop 130 located at the rear end of the feeding conveyor 115 may be adjusted into predetermined positions depending upon the width of the internal freight space of a container 300. This limit stop 130 defines the position of the advance path of loaded pallets on the conveying carriage (FIGS. 6 and 7).

Figure 8:
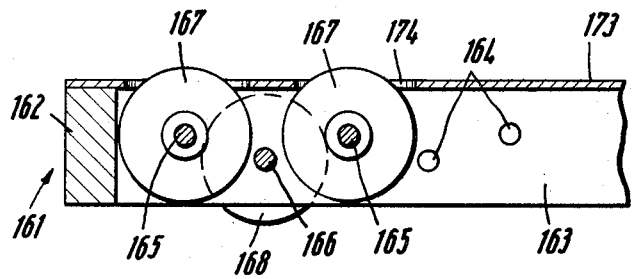
FIG. 8 is a fragmentary view of the roller carriage, partly in elevation and partly in vertical cross-section.
Figure 9:
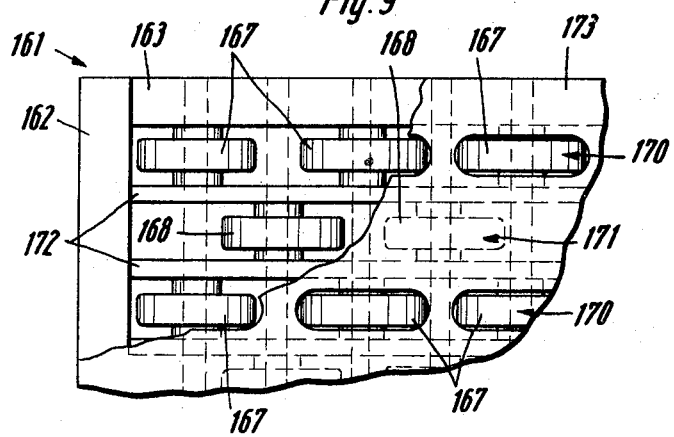
FIG. 9 is a fragmentary top view of the roller carriage.

The conveying carriage 160 essentially consists of a "carpet-like" roller carriage 161 movable along the pathway defined by the substantially plane track 140. The roller carriage 161 is of a somewhat smaller width than the internal width of the freight space within a container that is to be loaded. The length of the roller carriage 161 exceeds somewhat the length of the container. The roller carriage 161 comprises a substantially rectangular frame 162 with longitudinal beams 163 defining the longitudinal sides of the frame 162. In FIGS. 8 and 9 only one of these two longitudinal beams 163 of the frame 162 is shown. The longitudinal beams 163 are provided with bores 164 for receiving the axes 165, 166 of the rollers 167, 168. The bores 164 for the roller axes 165, 166 provided in the longitudinal beams 163 of the frame 162 are "staggered" in such a manner that succeeding rows of rollers 167, 168 project alternately at the top and at the bottom beyond the frame 162 (FIG. 8). Every axis 166 disposed between two adjacent axes 165 is offset with respect to these axes 165, i.e., the axes 166 define a plane spaced below a plane defined by the axes 165. Thus the rollers 167, 168 in every longitudinal row of rollers 170 or 171 respectively (see FIG. 9) are mutually offset in such a manner that the lower axes 166 of every alternate longitudinal row of rollers 171 extend between pairs of rollers 165 of every other adjacent longitudinal row of rollers 170. The roller axes 165, 166 support a plurality of mutually spaced intermediate longitudinal web plates 172 extending in a direction parallel to the longitudinal frame beams 163. The spacing between any two intermediate longitudinal web plates 172 is chosen such that the rollers in each longitudinal row of rollers 170 or 171 respectively are disposed in the clearance provided between mutually adjacent pairs of intermediate web plates 172. The frame 162 of the roller carriage 161 is covered at its upper surface with a perforated metal sheet 173 having a plurality of slot-shaped perforations 174 arranged respectively in the regions in which portions of the rollers 167 project above the upper surface plane defined by the frame 162 (FIGS. 8 and 9).

Figure 7:
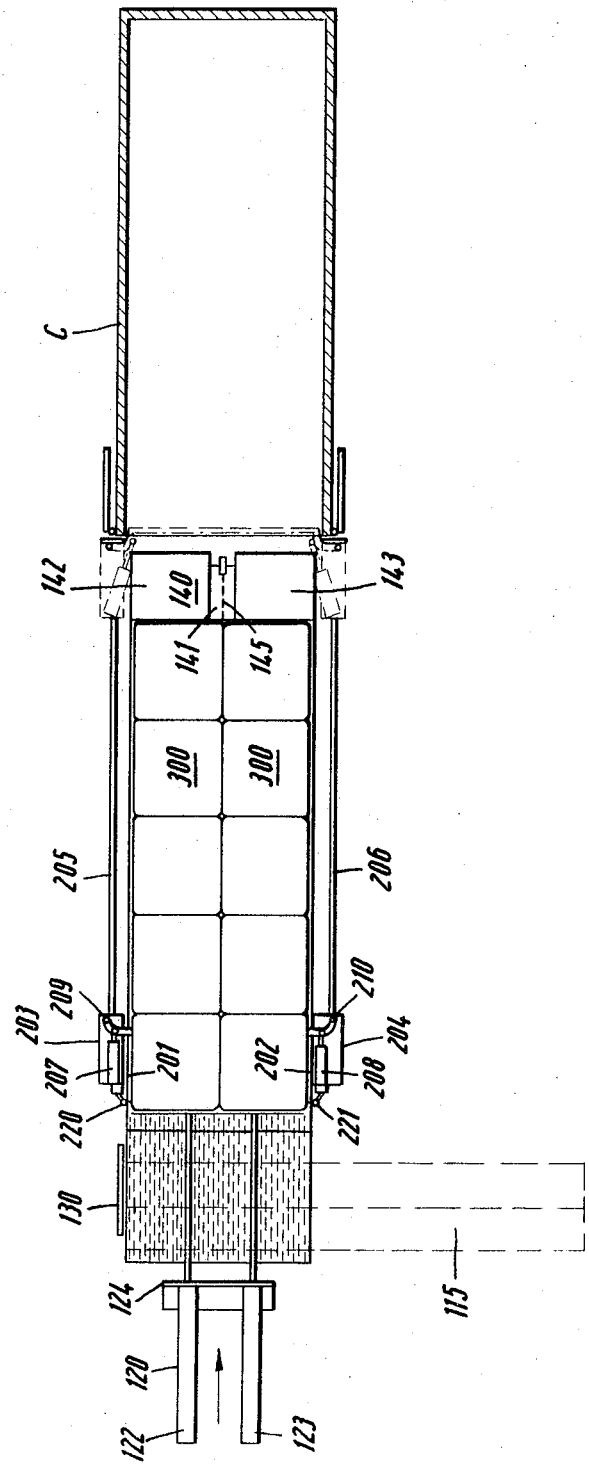
FIG. 7 is a top view of the apparatus shown in FIG. 6.
Figure 10:
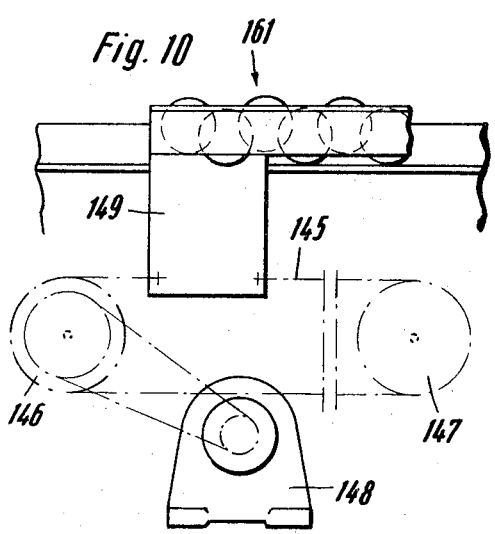
FIG. 10 is a lateral elevational view of the drive means for the roller carriage.
Figure 11:
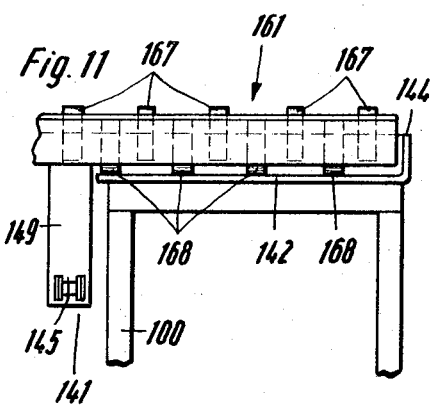
FIG. 11 is a fragmentary front elevational view of the roller carriage and of the track therefor.

The track 140 mounted in the base 100 and forming a pathway for the roller carriage 161 consists of a pair of mutually spaced steel plates 142, 143 mounted likewise on the base 100 and defining a longitudinal gap 141 (FIGS. 7 and 11). The outer longitudinal edges 144 of the steel sheets 142, 143 are bent upwardly and define lateral guides for the roller carriage 161 (FIG. 11). A drag chain belt 145 is arranged in the gap 141 between the two steel sheets 142, 143. The chain belt 145 is connected to a downwardly extending projection 149 of the roller carriage 161 at the carriage end remote from the end facing the container C. At opposite ends of the track 140 the chain belt 145 passes around guide sprocket wheels 146, 147, and one of these sprocket wheels, i.e., the sprocket wheel 146 is connected to a driving motor 148 (FIG. 10).

Referring to FIGS. 12, 13 and 14 the support 180 for mounting a container C consists of a substantially rectangular base frame 181 having in its four corner regions carrier elements 182, 183, 184, 185 adapted to be introduced into matingly shaped corner fittings 250 on a container C, as shown in FIG. 14. The carriage elements 182 – 185 serve to lock a container C that is to be loaded in position, and each carrier element 182 – 185 is operatively connected to a hoisting cylinder 186 allowing an elevational adjustment of the container mounting support 180 so that the upper surface of the container inner floor may be adjusted at an elevation at which the container floor is coplanar with an upper surface plane defined by the roller carriage 161. This feature ensures a step-free continuous transition of loaded pallets from the roller carriage 161 into the internal freight space of a container.

The clearance indicator frame 200 performing a control function by sensing the contours of the cargo loaded pallets and serving simultaneously for control purposes comprises a pair of lateral gate wings 201, 202 disposed on either side of the track 140 and of the roller carriage 161. The gate wings 201, 202 are mounted on carriage 203, 204 movable along lateral guide tracks 205, 206 respectively on the base 100. The gate wings 201, 202 are rotatably mounted about vertical axes 209, 210 by means of power actuators indicated in FIG. 7 at 207 and 208 respectively. These power actuators rotate the gate wings 201, 202 towards and away from the pallet feeding path. The gate wing carriages 203, 204 with the gate wings 201, 202 may also be moved along the guide tracks 205, 206 by means of suitable drive means not shown in the drawings. Control devices 220, 221 preferably in the form of limit switches are arranged in the fields of traverse of the gate wings 201, 202. Control devices of a different type such as light barriers or the like may also be used. The purpose of these control devices 220, 221 is to monitor an outward rotational movement of the gate wings 201, 202 from an initial gate wing position in which the gate wing clearance corresponds to the inner freight space width of a container to be loaded if such outward rotational movement is caused by cargo having an excess width, to deactivate the whole apparatus. The movement of the gate wing carriages 203, 204 with the gate wings 201, 202 is arranged in such a manner that during the advancing movement of the roller carriage 161 the gate wing carriages 203, 204 trail the roller carriage 161 whereby the gate wings 201, 202 are rotated into the closed position. At the end of the track 140 for the roller carriage 161 the clearance indicator frame 200 may be locked in position with the gate wings 201, 202 closed. The power actuators 207, 208 for the gate wings 201, 202 may consist of pneumatic cylinders to which a relatively small fluid pressure, i.e. a partial pressure is supplied when the gate wings 201, 202 are at the track end facing the container C and the roller carriage 161 is driven into the container C. When withdrawing the roller carriage 161 from the container C full fluid pressure is supplied to the pneumatic cylinders 207, 208 so that the pallets with the cargo thereon may be put down on the internal freight space of the container.

The operation of the container loading apparatus 40 is as follows: Two pallets having a combined overall length corresponding substantially to the width of the internal freight space of a container are fed, one immediately behind the other, along the feeding conveyor 115, to the hoisting roller train 111. On the hoisting roller train 111 the movement of the pallets is stopped in a predetermined position and the pallets are hoisted up to the elevation of the roller carriage 161. This operation may also be performed by means of the hoisting platform 32 (shown in FIG. 1). The pusher mechanism 120 which preferably comprises hydraulic cylinders 122, 123 and a thrust bar 124 (FIG. 7) pushes the two pallets onto the roller carriage 161 so that the hoisting roller train 111 may be lowered again to receive another pair of pallets.

These steps are repeated whereby the number of pallets required for filling the container freight space are successively transferred to the roller carriage 161 and each pair of pallets transferred onto the roller carriage advances, i.e. pushes ahead the pallets that are already disposed on the roller carriage towards the container until the first pair of pallets reaches the end of the roller carriage 161. The total area occupied by the pallets 300 on the roller carriage 161 corresponds substantially to the internal freight space area of a container C which is to be loaded. Since the length of the roller carriage 161 corresponds substantially to the length of the internal freight space of the container C, a pallet cargo compound substantially free from interstices and practically fully occupying the internal freight space of the container may be formed.

When the pallets are transferred onto the roller carriage 161 the pallets pass the gate-like clearance indicator frame 200 the gate wings 201, 202 of which are in the open position at that time. The pneumatic cylinders 207, 208 perform the opening and closing movements of the gate wings 201, 202. Both the opened and the closed positions of the gate wings 201, 202 are sensed respectively by means of the limit switches 220, 221. The gate clearance width defined by the more or less widely opened gate wings 201, 202 is selected so as to correspond exactly to the internal width of the container freight space. Whenever pallets are transferred which have a combined overall length exceeding the maximum internal width of the container such pallets urge the gate wings 201, 202, during the transfer operation, into a more widely opened position so that the limit switches 220, 221 will be actuated by the gate wings and the overall apparatus will be deactivated so that no further pallets may be supplied to the roller carriage 161.

When all pallets that are required for fully loading a container have been transferred onto the roller carriage 161 the latter is driven by means of the chain belt 145 along the track 140 into the container C whereby as mentioned above the roller carriage 161 moves along a plane coplanar with the floor of the container. During this operation, the gate wings 201, 202 are closed behind the last two pallets and are then driven by their associated drive motor (not shown) along the guide tracks 205, 206 in the same direction and with the same speed as the roller carriage 161, i.e., the gate wings trail the roller carriage 161.

If some part of the cargo should have been displaced and no longer passes freely through the container opening into the container freight space, then this part of the cargo and the pallets lined up behind will be shifted on the roller carriage 161 and thus be urged against the gate wings 201, 202. Since the pneumatic cylinders 207, 208 mounted on the gate wing carriages 203, 204 are only partially pressurized and in this operational cycle the gate wings 201, 202 will thus be opened, the limit switches 220, 221 will be actuated and the driving motor 148 for the roller carriage 161 will be stopped. As soon as the pallets have entirely entered the container C the gate wings 201, 202 will be locked in position, i.e., preferably locked to the frame of the container support 180, and the full fluid pressure will be supplied to the pneumatic cylinders 207, 208. The direction of rotation of the gear motor 148 driving the roller carriage 161 is then reversed and the roller carriage 161 withdrawn from the container whereby the roller carriage 161 passes below the closed gate wings 201, 202 now serving as abutments. During this reverse movement of the roller carriage the pallets are pushed off the roller carriage 161 within the container and in this manner put down on the container floor.

The mounting of containers C on the support 180 is effected such that the container C is simply lowered onto the extended carrier elements 182–185. These carrier elements 182 – 185 are disposed on the upper ends of hydraulic hoisting cylinders 186 having preferably a lifting stroke of approximately 2 inches. The container is then detached from the container transport gear and the container doors are opened. Then the carrier elements 182–185 on the hydraulic cylinders 186 may be lowered by venting corresponding associated valves (not shown) until the upper surface of the container floor is substantially coplanar with the upper bearing surface defined by the roller carriage 161.

The above described container/cargo handling plant is a multiple purpose installation. The container loading apparatus 40 allows fully automated loading of containers. The conveyor track 50 serves to feed loaded containers to the loading ramp indicated at 95 (FIG. 1) or to assemble any desired number of containers C12–C16 for subsequent loading. The hoisting and transporting apparatus 75 serves to load containers C12–C16 assembled on the conveyor track 50 onto trucks or to lift such containers from trucks. Empty containers such as the containers C8 to C11 may be put down on the conveyor track 60 of the support frame assembly 10 by means of the hoisting apparatus 75. The transfer hoist 30 serves to transfer empty containers from the conveyor track 60 onto the container loading apparatus 40 on the one hand, and to transfer containers to the platform levels 20, 21 for storage purposes on the other hand. The hoisting platform 32 serves for level equalization between container loading surface and container loading apparatus 40.

As may best be seen in FIG. 1, the container C18 is just being loaded in the container/cargo handling plant. Another five containers C12 – C16 which are already loaded are in standby position for loading in platform level 23. Four empty containers C8 – C11 are kept ready for loading in platform level 22. An empty container C19 is just being lifted from a rail vehicle. The transfer hoist 30 lifts an empty container C17 to one of the upper platform levels 20, 21 for storage. Eight empty containers C, C1 – C3 and C4–C7 are suspended in the upper platform levels 20 and 21 respectively. The storage capacity of the plant shown in 20 containers.

By laterally extending the support frame assembly 10 or adding additional platform levels the capacity of the plant may be increased as desired. Furthermore, any desired number of empty and/or full containers may be stored or kept in standby for loading by providing additional rails or roller tracks in the assembly area below the track 70 of the hoisting and transporting apparatus 75. In this case, the hoisting and transporting apparatus 75 serves to move such additional containers to and from the assembly area. The support frame assembly 10 may also include further platform levels for the storage of unused suspension means 80.

The operation of the container/cargo handling plant is briefly as follows, assuming that the containers have been loaded with cargo in the cargo loading apparatus 40:

In every platform level of the support frame assembly 10 are provided a number of suspension means 80. These suspension means 80 which may also be called "spreaders" are adapted to be blocked against movement along the tracks in the platform levels or to be moved by means of the entrainment means 85, 86. All of the suspension means 80 are provided with standardized trunnions adapted to engage matingly shaped corner fittings on the containers and to be interlocked therewith. The suspension means 80 are provided with means to attach the suspension means 80 to the cargo engaging member 76 of the hoisting and transporting apparatus 75. The cargo engaging member 76 may also comprise a device for interlocking the trunnions of the suspension means 80 with the corner fittings on a container. As shown in the drawing, the transfer hoist 30 has just removed an empty container C17 from the track in the platform level 22 or from any of the storage platform levels 20, 21. The container C17 is lowered onto the hoisting platform 32 where it is maintained in a position above the container loading apparatus 40 and in this position designated in the drawing as container C18. The container loading apparatus 40 is then brought into a position allowing to load the container. Then the container is loaded with cargo. Upon completion of the loading operation the loaded container is interlocked with a suspension means 80 and transferred along the platform level 23 into the region of the hoisting apparatus 75 which transfers the container onto a vehicle wating to be loaded with a container. For this operation, the transportation means does not necessarily have to be in a precisely defined transfer position. The hoisting apparatus 75 allows to put down a container in alignment with the loading platform of a vehicle. After release of the container the suspension means may be used for another container. The hoisting apparatus 75 takes up an empty container and transfers the same onto the platform level 22. Then the transfer hoist 30 removes an empty container from the platform level 22 and transfers the same into standby position in front of the loading apparatus 40. If there should be more empty containers then can be accommodated in the platform level 22 then the transfer hoist 30 transfers empty containers from the platform level 22 into the upper levels 20, 21 for storage. Not until all platform levels are fully occupied by containers any additional containers will be stored externally of the support frame assembly 10.

The container loading apparatus 40 may also be replaced by an apparatus for unloading full containers. In this case, the loaded containers arriving on vehicles are transferred to the unloading apparatus whereby the above described procedure is reversed. The hoisting apparatus 75 transfers full containers to the platform level 23, and from the platform level 23 such full containers are transferred to the unloading apparatus. As soon as the container is completely unloaded the transfer hoist 30 transfers the empty container into one of the upper platform levels for storage.

It should be pointed out that the invention is not intended to be restricted to the above described and merely illustrative embodiments nor to the details shown in the drawings but to encompass all modifications that may fall within the scope of the following claims. Thus the support frame assembly 10 may be provided with an enclosure or outer casing on some or on all sides for protecting the containers against adverse atmospheric conditions. The support frame assembly 10 may be erected of individual quick-mountable parts allowing to readily dismantle the support frame and erect the same in a different location.

What is claimed is:

1. A container/cargo handling plant adapted for loading, unloading and assembling containers with upper corner fitting and for loading and unloading containers into and from transportation means such as rail and road vehicles or inland shipping vessels, said plant comprising in combination a support frame assembly including at one side thereof a vertically extending hoisting shaft with a transfer hoist movable up and down within said hoisting shaft;

a plurality of containers supporting platform levels mutually spaced along the vertical extension of said support frame assembly, each platform level being in communication with said hoisting shaft;

a container loading apparatus or loading discrete cargo units into a container, said container loading apparatus disposed in the vicinity of the lower end of said hoisting shaft means for operating said container loading apparatus;

a horizontally extending first conveyor mounted in said support frame assembly and disposed in line with said container loading apparatus for feeding containers to said hoisting shaft;

a movable container hoisting and transporting apparatus for moving containers into a loading zone of said transportation means, drive means for said container hoisting and transporting apparatus, said container hoisting and transporting apparatus including a track and being disposed at the discharge side of said first conveyor and movable in a horizontal direction above said first conveyor;

a second conveyor mounted in said support frame assembly and spaced above said first conveyor and disposed in line with said track of said hoisting and transporting apparatus;

movable suspension means supported on said first and second conveyors and on said platform levels of said support frame assembly for moving containers, each suspension means including a frame corresponding substantially to the shape and size occupied by the base area of a container and mounting a plurality of axles, a plurality of rollers journalled on said axles, container engaging trunnions mounted on said suspension means and adapted to engage said upper corner fittings on said containers and to be interlocked with said corner fittings;

said first and second conveyors in said support frame assembly and said platform levels consist of pairs of runway rails and each pair of runway rails is arranged at a spacing corresponding substantially to the dimensions of said container and serves as a guide means for said container suspension means.

2. A container/cargo handling plant according to claim 1 wherein each of said conveyors in said support frame assembly comprises motor driven continuous chains means provided with engagement members for engaging said container suspension means to move said containers suspension means along said conveyors and along said platform levels of said support frame assembly.

3. A container/cargo handling plant according to claim 2 further including a central program cycle control device, wherein said motor driven continuous chain means for moving said container suspension means along said conveyors and along said platform levels of said support frame assembly, and said drive means for said container hoisting and transporting apparatus, and said means for operating said container loading apparatus are operatively connected to and controlled by said central program cycle control device.

* * * * *